July 11, 1967  K. G. KING  3,331,003
CONTROL SYSTEMS FOR ELECTRIC MOTORS
Filed May 1, 1963  2 Sheets-Sheet 1

INVENTOR
KENNETH G. KING

BY Larson and Taylor
ATTORNEYS

INVENTOR
KENNETH G. KING

United States Patent Office 3,331,003
Patented July 11, 1967

3,331,003
CONTROL SYSTEMS FOR ELECTRIC MOTORS
Kenneth G. King, King's Cross, London, England, assignor to Westinghouse Brake and Signal Company, Limited, London, England
Filed May 1, 1963, Ser. No. 277,275
Claims priority, application Great Britain, May 29, 1962, 20,620/62
6 Claims. (Cl. 318—231)

This invention relates to improvements in control systems for electric motors for predetermining the speed of an induction motor supplied with A.C. of variable frequency, despite variations in load and supply voltage and it is particularly, but not exclusively, applicable to such systems in which the variable frequency current supply is derived from a static inverter or frequency-changer.

Accordingly, the present invention provides a control system for predetermining the speed of an electric induction motor supplied with alternating current derived from variable frequency current supply means, in which the frequency of the current supply to the motor from said means is made dependent upon the repetition frequency of frequency signal generating means, the frequency of which is modified by a control signal which is itself a function of the torque imposed by a load on the motor such that the variations in frequency resulting from variations in torque correspond to the speed/torque characteristics of the motor and thereby provide a degree of compensation sufficient to hold the motor speed substantially constant.

The variable frequency current supply means may comprise an inverter or a frequency changer whilst the frequency signal generating means may comprise a pulse generator or an oscillator. The control signals may be derived from a sensing of the input current to the variable frequency current supply means supplying the motor, or from the current input to the motor.

The invention will now be described, by way of example only with reference to the accompanying drawings, in which.

Figure 1:
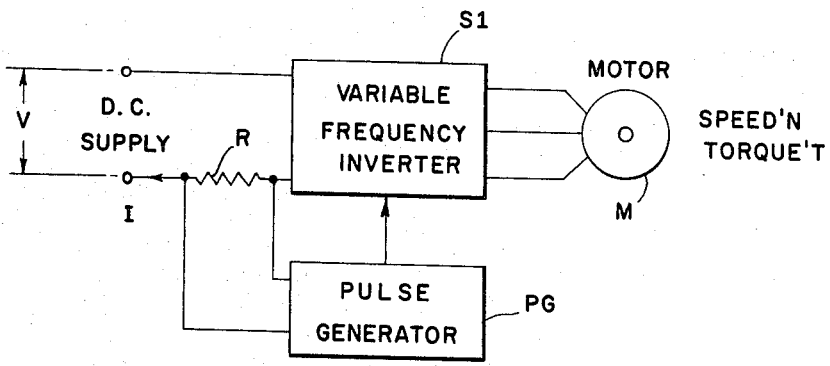
FIG. 1 is a schematic illustration of a control system in accordance with the invention in which an induction motor is supplied from a variable frequency inverter controlled by a pulse generator subject to a control signal derived from the input to said inverter.

Referring now to FIGURE 1, this illustrates an induction motor M having a speed N and a torque T, the motor being supplied from a variable frequency polyphase supply means, for example, an inverter SI, for supplying polyphase power to the motor. The inverter is fed from a D.C. supply at a current I.

The frequency of the supply from the inverter depends upon the repetition frequency of pulses firing controlled rectifiers embodied therein, this frequency being determined and modified by frequency control pulse signals supplied to the input terminals of the inverter from a control signal generating circuit such as a pulse generator PG.

The pulse generator PG is fed with a control signal developed across a resistor R, thereby sensing the current in the supply line, to the inverter, this control signal being a function of the torque imposed by a load on the motor M.

Variations in slip frquency resulting from variations in the torque of the motor M correspond to the known speed/torque characteristics of the motor and are consequently reproduced in the control signal sensed from the input to the inverter SI. This signal controls the pulse generator PG accordingly and, by appropriately compensating the timing of the pulses supplied to the inverter SI, provides a sufficient degree of compensation to the output from the inverter to the motor M to hold the motor speed constant.

In a specific example, and assuming the overall efficiency of the system to be substantially constant, the mechanical output from the motor M is proportional to the electrical input power to the inverter, or in other words, VI is proportional to NT. If the supply voltage V and motor speed N are assumed constant, I is proportional to T or $I = K_1 T$.

Figure 2:
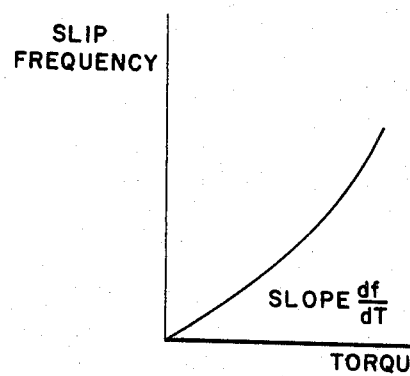
FIG. 2 is a graph illustrating the slip frequency plotted against the motor torque, the relationship shown applying only to a limited range of slip frequency near synchronism.
Figure 3:
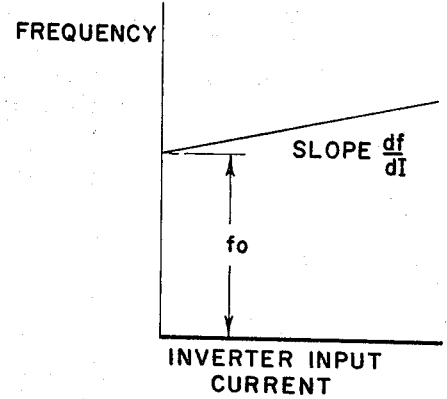
FIG. 3 is a graph illustrating the pulse generator control characteristic derived from plotting the frequency against the inverter input current.

FIGURE 2 illustrates the slope of the graph of frequency (d) plotted against torque (T), the frequency referred to here being the slip frequency and not the inverter frequency, whilst FIGURE 3 illustrates the control characteristics of the pulse-generator PG, the no-load condition being shown at fo.

Figure 4:
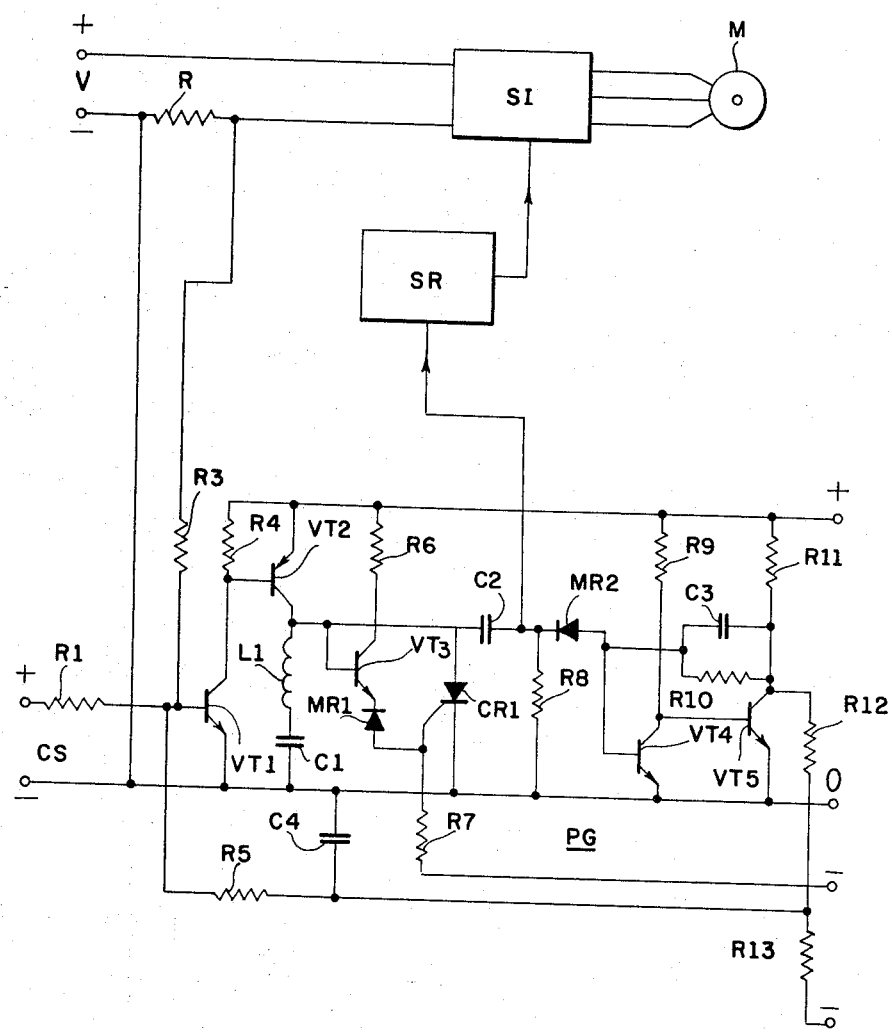
FIG. 4 is a more detailed circuit diagram than that in FIG. 1, showing a specific embodiment of the pulse generator.

FIGURE 4 illustrates a preferred form of the invention in which the pulse generator PG is of a type whose frequency is directly porportional to a control voltage, and it embodies a relaxation oscillator in which the charging current of a capacitor varies linearly with the control voltage.

In FIGURE 4, as in FIGURE 1, the induction motor M is supplied from a suitable form of three-phase controlled-rectifier inverter SI, the inverter being fed from a D.C. supply V.

The frequency of the supply from the inverter is dependent upon the repetition frequency of pulses firing the controlled rectifiers in it, this frequency being determined and modified by pulse signals supplied from the pulse generator PG via a conventional form of shift register SR.

The pulse generator PG comprises a relaxation oscillator formed by transistor VT2, inductance L1, series capacitor C1 and controlled rectifier CR1 and includes an emitter follower transistor VT3 and Zener diode MR1 as well as an input transistor VT1 and resistors R4 and R6 in the respective positive potential lines of the transistors VT1 and VT3.

The pulse generator PG also includes a monostable flip-flop circuit connected to the relaxation oscillator via a differentiating circuit comprising a capacitor C2 and resistor R8. The flip-flop circuit comprises transistors VT4 and VT5 and resistors R9, R10 and R11 and a capacitor C3 connected as shown with integrating resistors R12 and R13 in the negative potential line of the transistor VT5; the generator circuit being completed by resistors R5 and R7 and a capacitor C4.

In the operation of the circuit shown in FIGURE 4 a main motor speed reference signal CS is supplied to the transistor VT1 via a series resistor R1, and a control input signal voltage derived from the shunt R (as in FIGURE 1) is added to the main control input via a series resistor R3.

The capacitor C1 charges at a rate depending on the current in the transistor VT2 and the controlled rectifier CR1 is fired when the emitter potential of the emitter follower transistor VT3 rises sufficiently to overcome the avalanche voltage and Zener diode MR1, the freqeuncy depending on the collector current of the transistor VT2 and hence on the base current of the transistor VT1.

Negative-going pulses from the anode of the controlled rectifier CR1, obtained by differentiating with the capacitor C2 and resistor R8, drive the inverter SI, via the shift register SR, and also feed the monostable flip-flop circuit which produces constant-width pulses and, therefore, a mean output at the capacitor C2 via diode MR2, integrated by the said capacitor and resistors R12 and R13, and proportional to frequency.

This balances the control input CS and produces a linear characteristic of frequency against control current, the added control input from the shunt R functioning as previously described with reference to FIGURE 1.

For many practical purposes the slip frequency/torque curve of the motor M shown in FIGURE 2 may be considered sufficiently close to a straight line that a pulse generator PG as shown in FIGURE 4 having a linear characteristic will correspond sufficiently accurately to it.

If the inverter SI has a frequency designated as a matter of convenience also as $f$ and the motor M has a torque characteristic of slope $df/dT$ then the motor speed N will equal $$K_2\left(f - T\frac{df}{dT}\right)$$

If the pulse generator PG has a control characteristic of slope $df/dI$, then the inverter frequency $f$ equals $fo$ plus $$I\frac{df}{dI}$$

and the motor speed N equals $K_2$ $$\left(fo \text{ plus } I\frac{df}{dI} - T\frac{df}{dT}\right),$$

therefore $$\frac{dN}{dT} \text{ equals } K_2\left(\frac{df}{dI} \cdot \frac{dI}{dT} \cdot \frac{df}{dT}\right)$$

Thus, if the various constants of proportionality are related so that $$\frac{df}{dI} \cdot \frac{dI}{dT}$$

for the pulse generator PG equals $df/dT$ for the motor M, the $dN/dT$ equals 0 and the motor speed is independent of torque.

If the departure of the motor torque characteristic from linearity should be sufficient to cause a significant error, suitable non-linear components may be incorporated into the pulse generator control circuits to impart a compensating non-linearity.

It will be appreciated that if the supply voltage V varies, the relationship of input current to torque will be correspondingly modified.

For example, if the voltage V increases by 10 percent, then $K_1$ will decrease by approximately 10 percent, so that the increase of frequency with torque will be reduced.

The slip frequency of the motor M may be decreased with increasing supply voltage V but any undesirable error introduced may be compensated by means of a suitable voltage-dependent signal acting upon the control circuits.

The control characteristic may be stabilised by feedback through a pulse-counting or integrating network having a stable characteristic which is the inverse of that required of the pulse generator.

The control input is conveniently comprised of a fixed term which determines the frequency for the no-load condition ($fo$); and a variable term proportional to the inverter input current.

The variable term may be derived from a shunt resistor R, as shown in FIGURE 1, amplified if necessary; or it may be derived from a current transformer if the input to the inverter is an alternating current, as for example, if a D.C.-A.C. inverter is fed from a rectifier.

The fixed term may be varied to achieve a deliberate variation of speed, the torque compensation remaining substantially correct if the supply voltage is varied in proportion to the frequency.

Modifications may be made within the scope of the invention. For instance, the static inverter SI may be replaced by a frequency-changer whilst the control current for controlling the pulse generator or oscillator PG may be derived from a sensing of the current input to the motor M.

Having thus described out invention what we claim is:

1. A speed control system for an induction motor, comprising
   variable-frequency supply means (SI) operable in response to the repetition rate of a pulse train input for supplying polyphase alternating-current energy to said motor;
   current-sensing means (R) for generating a control voltage as a function of the current supplied to, and consequently the torque of, said motor;
   a source of motor speed reference voltage (CS); and
   voltage-responsive pulse generating means (PG) for feeding to said supply means a train of frequency control pulses the repetition rate of which is a function of the resultant of said control voltage and said reference voltage, said pulse generating means including oscillator means.

2. Apparatus as defined in claim 1 wherein said oscillator means comprises a relaxation oscillator including a capacitor (C1) the charging current of which varies substantially linearly with respect to said resultant voltage.

3. Apparatus as defined in claim 2, wherein said relaxation oscillator includes also an inductance (L1), a first transistor (VT2) having an emitter to collector circuit connected in series with said capacitor and said inductance, said first transistor including also a base electrode, an input transistor (VT1) connecting said base electrode with said reference voltage source, and means including an emitter follower transistor (VT3), a Zener diode (MR1) and a controlled rectifier (CR1) for connecting the emitter of said first transistor with said supply means.

4. Apparatus as defined in claim 3 wherein said pulse generator means includes also flip-flop circuit means, and differentiating circuit means including a second capacitor (C2) and a second resistor (R8) connecting said flip-flop circuit means with said relaxation oscillator.

5. Apparatus as defined in claim 4 wherein said flip-flop circuit means comprises an additional pair of alternately conductive transistors (VT4, VT5) interconnected by means of a resistor-capacitor network, and means including a pair of integrating resistors for applying a negative potential upon one of said transistors.

6. Apparatus as defined in claim 1, wherein said supply means comprises inverter means of the type including controlled rectifier means triggerable by said pulses for inverting direct-current energy to polyphase alternating-current energy having a frequency that is a function of the repetition rate of said pulses.

References Cited

UNITED STATES PATENTS

| | | | |
|---|---|---|---|
| 2,784,365 | 3/1957 | Fenemore | 318—231 X |
| 2,896,143 | 7/1959 | Bekey | 318—231 X |
| 3,105,180 | 9/1963 | Burnett | 318—231 X |

ORIS L. RADER, *Primary Examiner.*

G. FRIEDBERG, G. Z. RUBINSON,
*Assistant Examiners.*